Dec. 14, 1937.                E. WALDER                2,102,342
            ELECTRICAL COOKING AND HEATING APPARATUS
                  Filed June 11, 1931        3 Sheets-Sheet 1
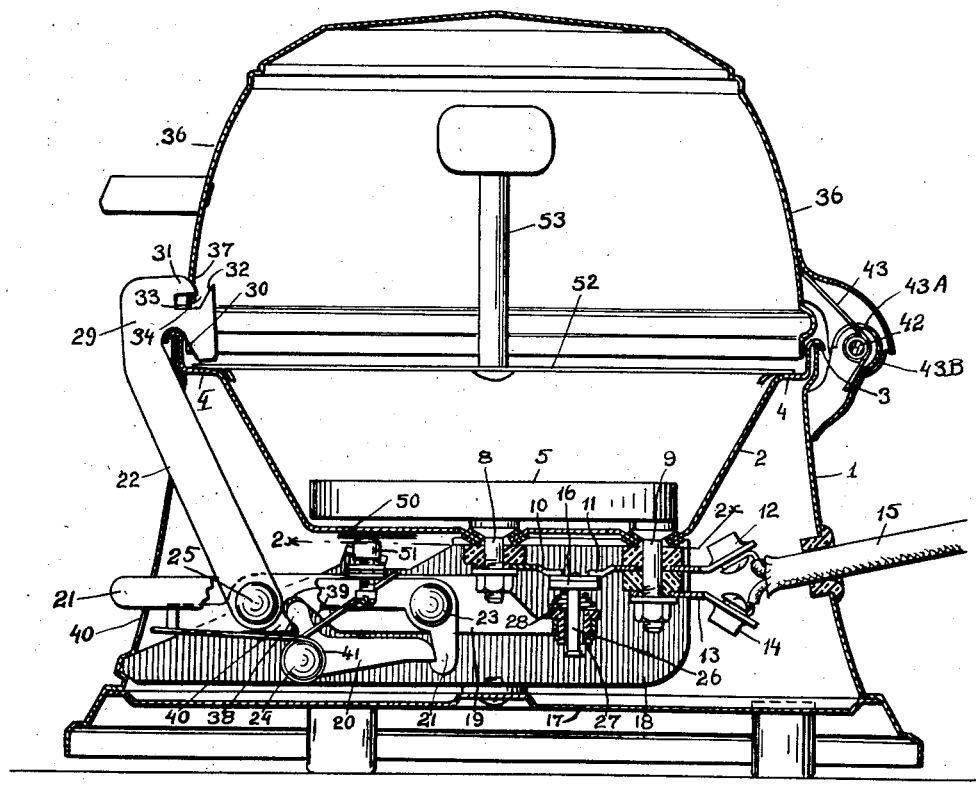
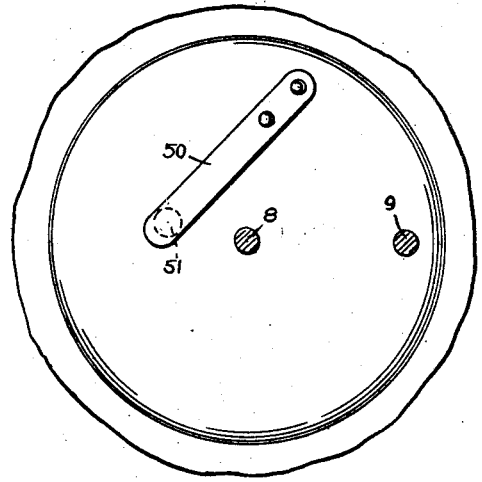
INVENTOR
EMIL WALDER
BY
ATTORNEY Dec. 14, 1937.  E. WALDER  2,102,342

ELECTRICAL COOKING AND HEATING APPARATUS

Filed June 11, 1931  3 Sheets-Sheet 2

INVENTOR
EMIL WALDER
BY

Dec. 14, 1937.   E. WALDER   2,102,342
ELECTRICAL COOKING AND HEATING APPARATUS
Filed June 11, 1931   3 Sheets-Sheet 3

INVENTOR
EMIL WALDER
BY
ATTORNEY

Patented Dec. 14, 1937

2,102,342

UNITED STATES PATENT OFFICE 2,102,342

ELECTRICAL COOKING AND HEATING APPARATUS

Emil Walder, Rochester, N. Y., assignor to Samson-United Corporation, Rochester, N. Y.

Application June 11, 1931, Serial No. 543,637

14 Claims. (Cl. 219—43)

This invention relates to electrical heating and cooking apparatus and has for its object to provide such an apparatus with improved and novel means whereby the cooking and heating operation may be performed thereby in time periods of predetermined and definite duration.

Another object of this invention is to provide the apparatus with means for automatically releasing the cover thereof in time periods of predetermined and definite duration to permit the escape of the steam from the apparatus to completely stop the cooking process in the apparatus.

These and other objects and attendant advantages will become more readily apparent from the detailed description of one embodiment of the invention which follows, reference being had to the accompanying drawings in which:

Figure 1 is a vertical sectional view of the heating and cooking apparatus as it appears when in operation.

Figure 2 is a horizontal sectional view of the apparatus showing the bottom of the cooking vessel of the apparatus, the section being taken on the line 2x—2x of Figure 1 and looking in the direction of the arrow.

In the several figures of the drawings like reference numerals indicate like parts.

Figure 3:
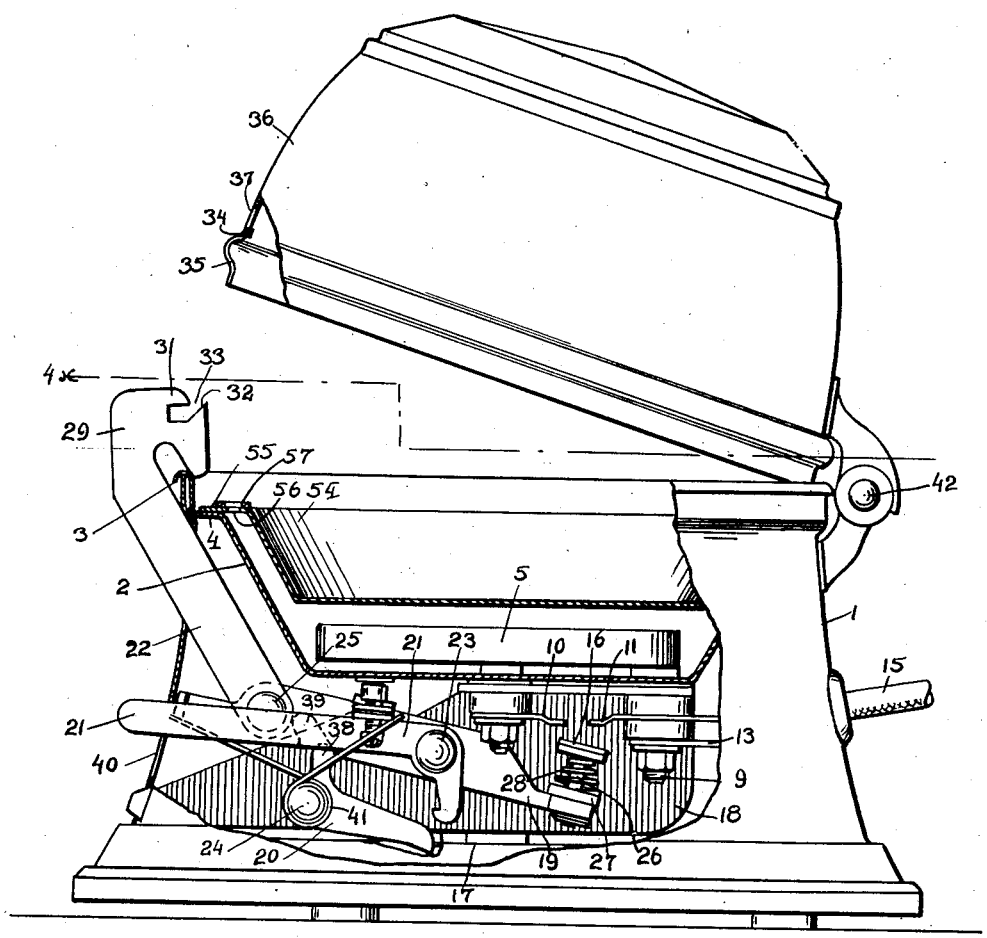
Figure 3 is a vertical sectional view of the apparatus with the parts illustrated in position as they will appear after the cooking operation has stopped.

The cooking and heating apparatus forming the subject matter of my present invention is intended for use in cooking, steaming and broiling any kind of food articles in which the process of cooking is to be timed for a predetermined time period.

As illustrated in the drawings, the apparatus comprises a suitable hollow base 1 having an open top in which is supported the cooking vessel 2. The outer rim of this vessel is provided with the inverted annular channel or groove 3 into which engages the top edge of the hollow base 1. The inside of the vessel 2 is provided with the annular shoulder 4 a short distance from its top and this shoulder serves as the support for the various cooking implements as will hereinafter be described.

Located within the cooking vessel near the bottom of it is the electrical heating unit 5 which consists of a suitable insulating grid having an inverted channel 6 in the bottom of it in which the resistance coil 7 is held anchored in place. The terminal studs 8 and 9 of the heating unit project thru the bottom of the cooking vessel and on these studs are provided suitable shoulders which hold the heating unit spaced slightly above the bottom of the vessel. On the under side of the bottom of the vessel 2 the terminal stud 8 has the contact member 10 clamped thereto to project laterally therefrom. Terminal stud 9 has clamped thereto at the same elevation the contact member 11 which projects laterally toward the contact member 10. This latter contact member is insulated from the terminal stud 9 and extends also to the right of it where the terminal 12 is provided thereon. Also clamped to the terminal stud 9 and at the same time electrically connected to it, is the terminal strip 13 which carries at the outer end the terminal 14. The ends of the electric wires of the cable are attached to the terminals 12 and 14 respectively so that the electrical energy may pass from terminal 12 to the contact member 11 and from this member to the contact member 10 by means of a movable contact 16 which bridges the gap between the two contact members, and from the contact member 10 thru the terminal stud 8, the resistance coil 7, terminal stud 9 to the terminal 14 to complete the electric circuit thru the heating unit.

Spaced between the bottom of the hollow base 1 of the apparatus and the bottom 17 of the cooking vessel 2 is the vertical supporting bracket 18. This bracket has the switch and releasing mechanism mounted thereon which comprises the rocker arm 19, the locking dog 20, the combined locking emergency releasing latch 21 and the locking and releasing arm 22. Both the rocker arm 19 and the combined locking and emergency releasing latch 21 are pivoted on the pivot stud 23 anchored in the side of the vertical bracket 18. The locking and releasing dog 20 is pivoted on the pivot stud 24 also anchored in the side of the supporting bracket 18, while the locking and releasing arm 22 is pivoted on the pivot stud 25 carried by the rocker arm 19.

Mounted at the right hand outer end of the rocker arm 19 is the spring pressed contact member 16 in the form of a disc having its surface faced with a silver facing to prevent the corrosion thereof. This contact member is mounted on the upper end of the stem 26 which is adapted to slide in the insulating bushing 27 carried in the outer end of the rocker arm 19. A conical expansion spring 28 surrounds the stem 26 and is interposed between the top of the bushing 27 and the bottom of the contact member 16 to yieldingly hold the contact member 16 in contact with the contact members 10 and 11 and insure a good electrical contact between these members whenever the rocker arm is moved to bring them together.

Mounted on the left hand side of the rocker arm 19 is the locking and releasing arm 22. This arm projects upwardly from the rocker arm thru an opening in the side of the hollow base 1 and has the locking head 29 provided at the upper end thereof. This head has an angular cam slot 30 in the bottom of it into which projects the outer edge of the cooking vessel 2. The head 29 is adapted to slide up or down on the edge of the cooking vessel on the raising and lowering of the locking head by its arm 22. In this way the locking head is given a lateral inward motion which moves it toward the vessel 2 on the downward movement of the arm 22 and a lateral outward motion away from the vessel on the upward movement of this arm.

The top of the locking head 29 is provided with the lateral projection or bolt 31 and the angular cam surface 32 with the notch 33 located between them. The angular cam surface 32 and the bolt 31 of the locking head are so arranged that when the head has been raised and is located at its extreme outer position, as illustrated in Figure 3, the shoulder 34, formed by the end of the notch 35 in the side of the cover 36, will engage the cam surface 32 on its downward movement and draw the locking head 29 towards it so that the bolt 31 thereof engages into the opening 37 in the wall of the cover above the notch 35.

At the same time the locking head is moved laterally by the cover it is also depressed by it so that the locking and releasing arm 22 rocks the rocking lever 19 from the angular position in Figure 3 to the horizontal position in Figure 1. This movement of the rocking lever brings the contact member 16 in contact with the contact members 10 and 11 and completes the electric circuit thru the heating coil to start the heating of it. As the locking lever is depressed, the lug 38 of the locking dog 20 slides up into the cam groove 39 provided in the bottom of the rocking lever and rocks the dog 20 on its pivot stud so that the lug 38 thereof overhangs the outer edge 40 of the cam slot 39 while the outer edge of the dog proper engages the hook shaped end of the combined locking and emergency releasing latch 21. This double engagement of the dog with the rocker arm 19 and the combined locking and emergency releasing latch 21 locks the rocker arm in the horizontal position into which it has been moved by placing the cover over the cooking vessel.

After the cover is placed onto the cooking vessel, as above described, it may be unlocked manually and raised again by the operation of the emergency latch 21; otherwise it will unlock itself and raise automatically after the cooking process has taken place within the apparatus as will hereinafter be described.

To operate the rocker arm manually by means of the emergency latch 21, for the purpose of opening the switch formed by the contact members 10, 11, and 16 and at the same time releasing the cover 36 and raising it, the outer end of the latch 21, which projects thru the opening 40 in the side of the hollow base 1, is depressed. This disengages the outer end of the dog 20 from the latch 21 so that the coil spring 41, which is wound around the stud 24 and engages the rocker arm with one end thereof, can rock the rocker arm 19 to move the contact member 16 away from the contact members 10 and 11 to open the electric circuit and raise the locking and releasing arm 22 to lift the cover and move the locking head out of locking engagement therewith.

Figure 4:
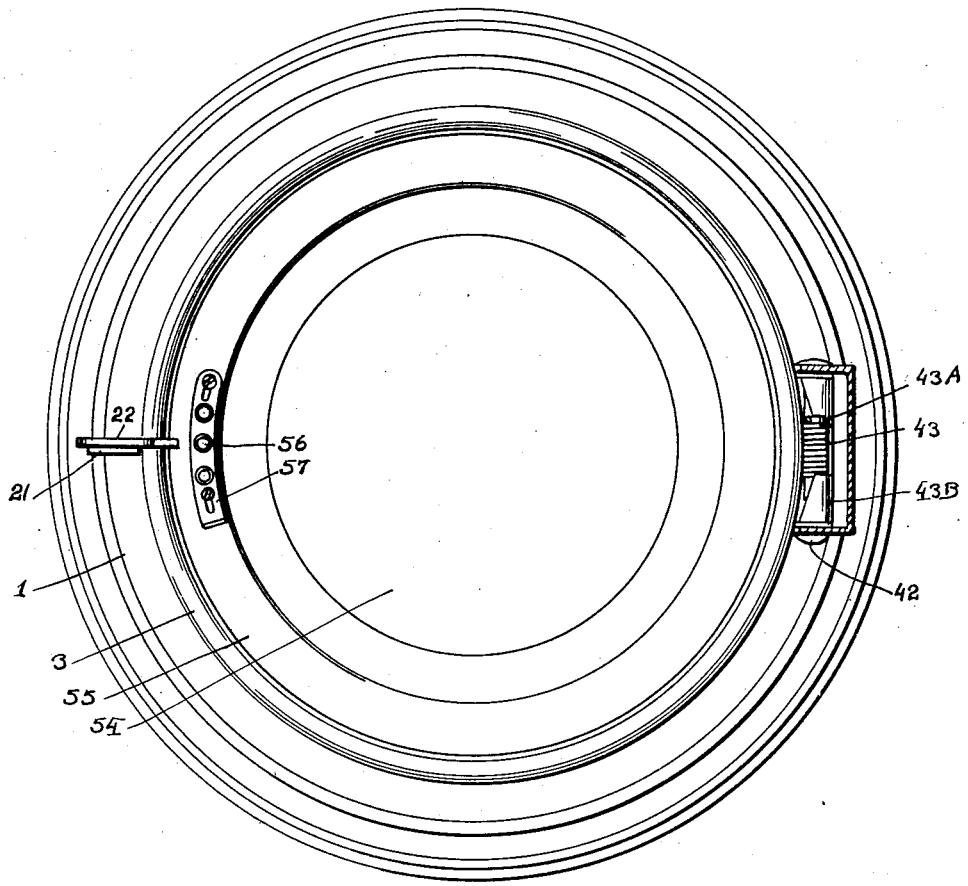
Figure 4 is a partial top plan view and section of the apparatus illustrated in Figure 3, the section being taken on the line 4x—4x of Figure 3.
Figure 5:
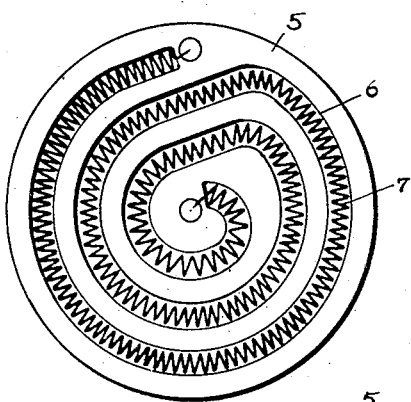
Figure 5 is a detail bottom plan view of the electrical heating unit.
Figure 7:
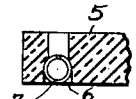
Figure 7 is a sectional view of a portion of the heating unit, the section being taken on the line 7x—7x of Figure 6.
Figure 6:
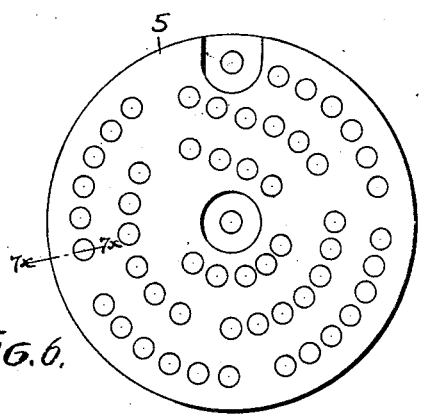
Figure 6 is a top plan view of the heating unit.

The cover 36 is hinged to the hollow base 1 on the stud 42 and a coil spring 43, surrounding the pivot stud, serves to raise the cover to a suitable angular position after it has been released by the locking head. To prevent the cover from flying up too far after it has been released by the locking head, a shoulder 43A is provided in the shell 43B which partially surrounds the pivot stud as illustrated in Figures 1 and 4. When the spring strikes this shoulder as it moves with the cover on the opening of it, a further movement of the spring is arrested by it so that it cannot lift the cover any higher. This leaves it to the operator to raise the cover the remaining distance.

When it is desired to automatically time the cooking and heating process, a predetermined small amount of water is measured into the cooking vessel before the cover is placed over it. This will partially or wholly submerge the heating unit within the cooking vessel. The cover is then closed over the cooking vessel and automatically locked in place while the electric switch is automatically closed to heat the heating unit. The small body of water placed into the vessel is quickly brought to boiling by the heating unit and begins to vaporize until finally all of the water has been vaporized. While water is still present in the cooking vessel and covers the bottom of it, the bottom of the cooking vessel can only be heated to the boiling point of the water by the heating unit. As soon however as the water has been completely vaporized, the heating unit begins to heat the bottom to a higher degree by radiating its heat directly against the bottom of the vessel. This increased heat thus created on the bottom of the cooking vessel then operates the thermostatic element 50 which is mounted on the under side of the bottom of the cooking vessel and comprises a flat member, one end of which is suitably fastened to the cooking vessel, while the other end is free to deflect as the temperature is raised.

The thermostatic element is mounted on the cooking vessel so that its free end is located directly above the adjustable lug 51 carried by the combined locking and emergency releasing latch 21. This lug is adjusted so that the pressure of the thermostatic element 50 against the lug 51 will depress this lug only when the temperature of the bottom of the cooking vessel and that of the thermostatic element rises after the water has been vaporized. On the depression of the lug 51, the latch 21 disengages the locking dog which releases the cover 36 and opens the electric switch, as above described, in connection with the manual operation of the apparatus.

The time period it takes to vaporize the body of water placed into the cooking vessel is therefore the time period during which the apparatus remains in operation and it is by increasing or decreasing this amount of water that the time period of the cooking process is correspondingly increased or decreased therein.

In Figure 1 I have illustrated the cooking apparatus equipped with an egg tray 52 which is provided with a handle 53 with which it is placed into or taken out of the cooking apparatus. This tray is adapted to rest on the shoulder 4 of the cooking vessel 2 to support the eggs within the cooking apparatus. A predetermined amount of water, depending on the time it takes to boil the eggs, is placed in the cooking vessel and when this water has evaporated, the cover is automatically unlocked and raised so that the steam from the evaporation of the water immediately escapes from the apparatus which completely stops any further boiling or heating of the eggs.

In Figure 3 I have shown the apparatus equipped with an auxiliary cooking vessel 54. This vessel is suspended from the shoulder 4 of the cooking vessel by an annular flange 55 which is adapted to rest on the shoulder 4 and center the vessel 54 within the vessel 2 with a suitable space between them. The articles of food which are to be cooked are placed into the auxiliary vessel and the proper amount of water, according to the desired cooking period, is placed into the cooking vessel 2. When the cover is closed the cooking process begins and continues until the water has been evaporated, after which the cover opens and the heating unit is shut off.

To permit the steam to assist in cooking the articles of food, an opening 56 is provided in the auxiliary vessel thru which the steam may pass as it is vaporized by the heating unit. This opening may be closed by means of the slide 57 when it is desired to cook the articles of food with dry heat only.

I claim:

1. An electric cooking and heating apparatus comprising a vessel adapted to receive a body of vaporizable liquid, an electric heating unit mounted within said vessel so as to be completely surrounded by the vaporizable liquid in the vessel, a thermostatically operated switch mounted on said vessel so as to be operated only by the direct radiation from said heating unit after the vaporizable liquid has been vaporized thereby.

2. An electric cooking and heating apparatus, comprising a vessel adapted to receive a body of vaporizable liquid, an electric heating unit comprising a resistance coil substantially nonconductively mounted within said vessel so as not to raise the temperature of the vessel above the temperature of the liquid heated therein and to have the vaporizable liquid in contact with said resistance coil until practically all of the liquid is vaporized thereby, a thermostatic element mounted on said vessel and operated by the heat generated by said resistance coil and radiated therefrom after vaporizing the liquid in contact therewith and an electric switch operated by said thermostatic element.

3. An electric cooking and heating apparatus as set forth in claim 1 including means for operating said switch separately from the operation by the heating unit.

4. An electric cooking and heating apparatus comprising a vessel adapted to receive a body of vaporizable liquid, a heating unit comprising a resistance coil substantially nonconductively mounted within said vessel so as not to raise the temperature of the vessel above that of the liquid contained therein, said resistance coil being spaced from the wall of the vessel so as to have vaporizable liquid separate substantially the entire resistance coil from the wall of the vessel, a thermostatic element mounted on the wall opposite to said resistance coil so as to be affected by the heat from said resistance coil after vaporizing the portion of the body of the vaporizable liquid located between the resistance coil and the wall of the vessel.

5. An electric cooking and heating apparatus comprising a vessel adapted to receive a body of vaporizing liquid, a cover for said vessel, a heating unit adapted to vaporize the liquid within said vessel, a thermostatic element carried by said vessel and operated by the rise in the temperature of the vessel after the liquid has been vaporized therein, and locking means for locking said cover in place on said vessel, said thermostatic element operating to release said locking means after the liquid has been vaporized therein, and means for unlocking said cover without the aid of said thermostatic means.

6. An electric heating and cooking apparatus comprising a vessel adapted to receive a body of vaporizing liquid, a cover hinged on said vessel, an electric heating unit mounted within said vessel and adapted to vaporize the liquid contained therein, a thermostatic element located on the outside of said vessel and combined switch and locking means controlling the electrical energy for said heating unit and locking said cover to said vessel, said thermostatic element operating said combined switch and locking means to simultaneously shut off the electric energy from said heating unit and release said cover.

7. An electric heating and cooking apparatus comprising a vessel adapted to receive a body of vaporizing liquid, a cover hinged on said vessel, an electric heating unit mounted within said vessel and adapted to vaporize the liquid contained therein, a thermostatic element located on the outside of said vessel and combined switch and locking means for controlling the electrical energy for said heating unit and locking said cover to said vessel, said thermostatic element operating said combined switch and locking means to simultaneously shut off the electric energy from said heating unit and release said cover, and yielding means for raising said cover on the release thereof to permit the escape of the vaporized liquid from said vessel simultaneously with the shutting off of the electric energy.

8. An electric heating and cooking apparatus comprising a vessel adapted to receive a body of vaporizing liquid, a cover hinged on said vessel, an electric heating unit for vaporizing the liquid, a switch for controlling the electric energy for said heating unit, a combined locking latch and operating lever and means provided on said cover to engage said locking latch and simultaneously lock said cover to said vessel and close said switch to start the heating of said heating unit.

9. An electric heating and cooking apparatus comprising a vessel, a second vessel supported within said first vessel with a space between said first and second vessel adapted to receive a body of vaporizing liquid, a heating unit located in the space between said first and second vessel adapted to vaporize the liquid between the first and second vessel, a cover over said second vessel to provide a closed cooking or heating chamber with said second vessel, said second vessel having an opening therein to permit the escape of the vaporized liquid from the space between said vessels into said second vessel and a thermostatic element operating to shut off said heating unit on the rise of the temperature in the space between said first and second vessel after the liquid has been vaporized therein and has escaped into said second vessel.

10. An electric cooking and heating apparatus comprising a vessel adapted to receive a body of vaporizing liquid, an insulating base having a groove in the bottom thereof, and located within said vessel in close proximity to the bottom thereof, an electric heating unit located within said groove and facing the bottom of said vessel, a thermostatic element mounted on the bottom of said vessel on the outside thereof opposite to said heating unit to be operated by the increased heat conducted from said heating unit against the inside of the bottom of said vessel after eliminating the liquid located between them by the vaporization thereof.

In an electric cooking and heating apparatus the combination of a vessel, a cover hinged to said vessel, a latch, a cam surface on the under side of said latch adapted to slide over the edge of said vessel and move said latch out or in thereon on the up or down movement thereof to have said latch disengage itself from said cover to release it or engage the cover to lock it to said vessel, a dogging means for holding said latch in its locking position and spring pressed means for raising said latch on the release by said dogging means.

12. In an electric cooking and heating apparatus the combination of a vessel, a cover hinged to said vessel, a latch, a cam surface on the under side of said latch adapted to slide over the edge of said vessel and move said latch out or in thereon on the up or down movement thereof to have said latch disengage itself from said cover to release it or engage the cover to lock it to said vessel, a rocking lever, a contact member carried on one side of said lever, said latch being pivoted to the other side of said lever, a heating unit for heating said vessel, a pair of fixed contact members electrically connected with said heating unit, said lever operating to bring its contact member in contact with said fixed contact members to close the electric circuit thru said heating unit while moving said latch down to lock said cover in place on said vessel.

13. An electric cooking and heating apparatus comprising a vessel adapted to contain a body of vaporizing liquid, an electric heating unit mounted within said vessel in close but spaced relation to the bottom thereof so as to have the bottom of the heating unit submerged in the body of liquid, a switch for controlling the electrical energy for said heating unit embodying an operating lever, a locking and releasing lever for said operating lever, a locking dog engaging said operating lever with one end thereof and engaging said releasing lever with the other end thereof to hold said operating lever in a position to close said electric switch and thermostatically operated means mounted on the outside of the bottom of the vessel for releasing said releasing lever from said locking dog to release said operating lever from said dog and yielding means for moving said operating lever to open said switch on the release of said operating lever.

14. An electric cooking and heating apparatus comprising an outer vessel and an inner vessel separated by a space adapted to receive a vaporizable liquid separate from the contents of said outer vessel so as to be separately vaporizable therefrom, a heating unit mounted within said space so as to be substantially surrounded by the liquid placed between the vessels, a thermostatic element provided on the outer vessel and an electric switch operated by said thermostatic element on the radiation of heat by said heating unit against said outer vessel after the vaporizable liquid between said heating unit and said thermostatic element has been vaporized.

EMIL WALDER.